US006549541B1

(12) United States Patent
Sainio et al.

(10) Patent No.: US 6,549,541 B1
(45) Date of Patent: *Apr. 15, 2003

(54) BUFFER MANAGEMENT

(75) Inventors: Sampo Sainio, Espoo (FI); Holma Maunu, Helsinki (FI); Timo Paajanen, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,467

(22) Filed: Apr. 25, 2000

Related U.S. Application Data

(63) Continuation of application No. PCT/FI98/00837, filed on Oct. 27, 1998.

(30) Foreign Application Priority Data

Nov. 4, 1997 (FI) .................................. 974130

(51) Int. Cl.⁷ .................... H04L 12/56; H04J 3/16; H04J 3/14; H04G 3/64
(52) U.S. Cl. .................. 370/412; 370/230; 370/429
(58) Field of Search .................. 370/229, 230, 370/389, 395.1, 412, 428, 429, 230.1

(56) References Cited

U.S. PATENT DOCUMENTS

| 5,434,848 A | | 7/1995 | Chimento, Jr. et al. | |
| 6,034,945 A | * | 3/2000 | Hughes et al. | 370/230 |
| 6,134,239 A | * | 10/2000 | Heinanen et al. | 370/412 |
| 6,181,705 B1 | * | 1/2001 | Branstad et al. | 370/410 |

FOREIGN PATENT DOCUMENTS

| EP | 0 706 298 | 4/1996 |
| EP | 0 748 087 | 12/1996 |
| EP | 0 838 970 | 4/1998 |
| JP | 09261238 | 10/1997 |
| WO | 97/03549 | 2/1997 |
| WO | 97/43869 | 11/1997 |

OTHER PUBLICATIONS

Apr. 23, 1999, International Search Report for PCT/FI98/00837.

* cited by examiner

*Primary Examiner*—Hassan Kizou
*Assistant Examiner*—Ahmed Elallam
(74) *Attorney, Agent, or Firm*—Squire, Sanders & Dempsey, L.L.P.

(57) ABSTRACT

The invention relates to a buffer management method for sharing the storage capacity F of a buffer between its users, such as queues, communication links or equivalent, which store packets in the buffer, in which method the total number of packets stored in the buffer is calculated and, based on this, the buffer capacity to be granted to the users is controlled. According to the invention, a modified total number of packets T* stored in the buffer is determined from equation (1), where N=total number of users; a(i)=minimum buffer capacity (a(i>0)) allocated for user i; and c(i)=actual buffer capacity occupied by user i at the reference instant. Further, the storage of additional packets by user i is inhibited if the total T*>F and c(i)>a(i).

$$T^* = \sum_{i=1}^{N} \max\{a(i), c(i)\}$$

4 Claims, No Drawings

BUFFER MANAGEMENT

This is a Continuation of Application No. PCT/FI98/00837, filed Oct. 27, 1998.

The present invention relates to a buffer management method for ensuring a certain minimum buffer for each buffer user in an apparatus employing a shared buffer storage, such as an ATM switching apparatus (ATM, Asynchronous Transfer Mode).

In present wide-bard data networks, buffering is a "bottleneck". Buffering is used for temporary data storage in a situation where the receiving party is unable to receive the data at the same rate as it has been transmitted. The data to be buffered is generally stored in a so-called buffer storage. In prior art, several buffer management methods for maximising the utilisation of the available buffering and transfer capacity are known.

In general, the sharing of a buffer is closely associated with the decision-making process that produces the decision as to what part of the data in the buffer is to be deleted when data of a higher priority level is coming in or whether the data is to be admitted into the buffer at all.

In principle, three types of buffer management method are known: complete partitioning, complete sharing and partial sharing. Complete partitioning means that the entire buffer capacity is allocated to concurrent users or entities (e.g. priority classes or queues) so that the sum of segments allocated does not exceed the buffer capacity. Complete sharing means that all users are allowed to occupy buffer space until the buffer is full. Users may be assigned individual maximum limits to ensure that a single user will not occupy the whole buffer space. When the sum of the maximum limits approaches the total buffer capacity, complete sharing approaches complete partitioning. The implementation of complete sharing often comprises a so-called pushout feature, which means that a higher-priority cell or data received in the buffer supersedes a lower-priority cell or data if the buffer is full. In partial sharing (also known as threshold method), a certain threshold is designated for the defeat of each priority. In this case, data belonging to a given class is admitted into the buffer if the amount of data of this priority class in the buffer is below the threshold designated for that class. The pushout mechanism or threshold method requires that different priorities have been defined for data.

A problem with the threshold method is that it is impossible to guarantee a minimum buffer while at the same time using the buffer effectively. A problem with the pushout method is that the method is difficult to implement using equipment known so far. Moreover, it is difficult to judge and identify the data or cell to be deleted when data of a higher priority level is received in the buffer.

Another problem with prior-art methods is that while the counters used to count the data packets or cells do know the actual number of packets or cells, they do not know what part of the cells is guaranteed and what part is not.

The object of the present invention is to eliminate the problems described above.

A specific object of the present invention is to disclose a new type of buffer management method. A further object of the invention is to disclose a buffer management method in which minimum thresholds and rejection rules are observed so that a minimum buffer space can be guaranteed for each user of the buffer and the remaining buffer space can be allocated dynamically among all users.

The invention relates to a buffer management method for sharing the storage capacity F of the buffer between buffer users, such as queues, communication links or equivalent, which store packets in the buffer. A packet may be an ATM cell, and IP packet (IP, Internee Protocol) of equivalent, depending on the use and the application. In this method, the total number of packets stored in the buffer and the total number stored by each user are counted or determined. Based on these, the amount of buffer capacity to be granted to the users is controlled with respect to each packet, i.e. each time when a user attempts to store a packet in the buffer, a function determining whether the user is to be accorded buffer space or not is executed.

According to the invention, a modified total number of packets T* stored in the buffer is determined from the equation:

$$T^* = \sum_{i=1}^{N} \max\{a(i), c(i)\}, \text{ where} \tag{1}$$

$N$ = total number of users;

$a(i)$ = minimum buffer capacity $(a(i) \geq 0)$ allocated for user $i$; and $c(i)$ = actual buffer capacity occupied by user $i$ at the reference instant.

As in buffer management in general, buffer control in this invention, too, is based on rejection of packets, i.e. on making a decision as to whether a packet is to be admitted into the buffer or not. Further, according to the invention, if the conditions $T^* \geq F$ and $c(i) \geq a(i)$ are true, then a packet of user i is rejected without storing it in the buffer.

It is to be noted that equation (1) is a logical representation of the counter T*. The counter T* may be implemented by various systems, including, but not limited to, an apparatus employing a shared buffer storage, such as an ATM switching apparatus.

For example, the following methods can be used to determine the value of the counter T*:

1) Each time a packet comes in or leaves the buffer, T* is calculated in, accordance with equation (1).
2) T* is calculated in accordance with equation (1). After this, the following is done: When a packet is coming in to the buffer for user i, the value of the counter T* is increased if the packet is accepted and $c(i) \geq a(i)$ (before c(i) is updated). When a packet of user i leaves the buffer, the value of the counter T* is decreased if $c(i) > a(i)$ (before c(i) is updated).

As compared with prior art, the invention has the advantage that a minimum buffer can be reliably guaranteed for each buffer user.

Another advantage of the invention is that the buffer capacity left over after the allocation of a minimum capacity for the users can be flexibly and dynamically shared among users that may need it. In this way, the objects of guaranteeing a minimum buffer for each user and effective buffer utilisation are realised.

The buffer management method, calculation of a modified total amount and rejection rule described above can be applied in many ways. In a preferred embodiment of the invention, the buffer management method can be applied among a selected set of users U, in which case the modified total T* is calculated from the equation $$T^* = \sum_{\substack{i=1 \\ i \in U}}^{N} \max\{a(i), c(i)\}, \text{ where} \tag{2}$$

-continued $N$ = total number of users;

$U$ = set of selected users;

$a(i)$ = minimum capacity ($a(i) \geq 0$) allocated for user $i$ in the buffer; and $c(i)$ = actual buffer capacity occupied by user $i$ at the reference instant.

In this embodiment, a certain portion $F_Q(U) \leq F$ of the storage capacity of the buffer is allocated for the selected users, and the storage of additional packets by user i is inhibited if the total $T^* \geq F_Q(U)$ and $c(i) \geq a(i)$. Users not included in set U may use any method to share the remaining portion $F-F_Q(U)$ of the buffer.

Further, it is possible to form user groups k=1,2, . . . ,M. The members of a group have an equal minimum buffer capacity each. If M=1, then all users have equal minimum buffers.

If the method is used in ATM, then UBR communication can be included by setting the minimum buffer as a(i)=0. For VBR communication, the minimum buffer can be set to be equal to the maximum burst size of the connection: a(i)= MBS(i). In this case, a VBR connection has its own buffer area of a size equal to the maximum burst size, and this area cannot be occupied by others. (If additionally bursts exceeding MBS(i) are eliminated by policing, then the VBR connection itself will not take up any space in the shared buffer area!). CBR (CBR, Constant Bit Rate) communication can be handled in a corresponding manner.

In a preferred embodiment of the buffer management method of the invention, in addition to the above, a maximal buffer capacity b(i) that the user may occupy in the buffer at a time is defined for each user. In this embodiment, the storage of additional packets by the user is also inhibited when the maximal user-specific buffer capacity has been reached, i.e. the condition $c(i) \geq b(i)$ is valid. The maximal buffer capacity b(i) can also be changed dynamically e.g. on the basis of the free capacity available in the buffer. This makes it possible to guarantee a certain fairness between the users in the sharing of buffer capacity exceeding the modified total $T^*$.

In the following, the invention will be described by the aid of examples of preferred embodiments.

In the examples, the following symbols are used: F is the buffer size, i=1,2, . . . ,N are the buffer users, c(i) refers to the total number of packets stored in the buffer by user i, a(i) refers to the minimum buffer allocated for user i, $T^*$ refers to the modified total number of packets in the buffer and $F_Q$ refers to a buffer allocated for user groups.

In a first example, it is assumed that F=10, N=4 and a(i)=2; i=1,2,3,4. In addition, it is assumed that c(1)=2, c(2)=1, c(3)=0 and c(4)=0. In this case, the modified total $T^*$=8. If user 1 adds two packets into the buffer (c(1)=4), then the modified total $T^*$=10. When user 1 attempts to store a fifth packet in the buffer, then c(1)>a(1) and $T^* \geq F$ will be true. Thus, in the buffer management method of the invention, the addition of a fifth packet by user 1 is inhibited. Moreover, it can be seen from the example that in this situation only five buffer locations have been allocated, so the five packets corresponding to the minimum buffer for the other users can be stored in the buffer and thus each user can be guaranteed a certain minimum share in the buffer.

In a second example, a case is considered where some of the buffer capacity is shared between selected users U. Let F=20, N=8, $F_Q(U)$=12, U={1,2,3,4,5,6}. The minimum buffers are a(1)=2, a(2)=1, a(3)=2, a(4)=2, a(5)=1, a(6)=1; users 7 and 8 may use any method to share the remaining portion $F-F_Q(U)$ of the buffer. It is assumed that $c(i) \leq a(F)$ when i=1,2, . . . ,5. The modified total $T^*$ is now calculated rom equation (2), and the modified total thus obtained is 9. At some point there may appear a situation where, as an excentior. to the above, c(2)=2 and c(5)=3. In this case, the modified total $T^*$=12, with the result that none or the users i can add packets into the, buffer beyond the minimum capacity allocated for the user.

The invention is not restricted to the examples of its embodiments described above, but many variations are possible within the scope of the inventive idea.

What is claimed is:

1. A buffer management method for sharing storage capacity of a buffer between users of the buffer, said buffer having storage capacity for storing packets from the users, in which method buffer capacities to be granted to the users are controlled, wherein the method comprises:

assigning minimum buffer capacities to users;

receiving at a given instant one or more additional packets of a given user to be stored in the buffer;

selecting for each user the larger capacity value of said minimum buffer capacity assigned to the user, or actual buffer capacity occupied by the user at said given instant;

calculating a modified total number of packets stored in the buffer by summing up the selected capacity values; and inhibiting said storing of additional packets, if said calculated modified total number of packets stored in the buffer exceeds or equals said storage capacity of the buffer, and if the actual buffer capacity occupied by said given user at said given instant exceeds or equals the minimum buffer capacity assigned to said given user.

2. The method as defined in claim 1, wherein the method further comprises dividing the users or some of the users into groups, the members of a group having an equal minimum buffer capacity each.

3. The method as defined in claim 1, wherein the method further comprises:

allocating also a maximal buffer capacity that the user may occupy in the buffer at a time for each user, and inhibiting the storage of additional packets by the user also when the user-specific maximal buffer capacity has been reached.

4. A buffer management method for sharing a portion of storage capacity of a buffer among a subset of its users, said buffer having storage capacity for storing packets from the users, in which method buffer capacities to be granted to the users are controlled, wherein the method comprises the steps of:

assigning minimum buffer capacities to each user of said subset of users, receiving at a given instant one or more additional packets of a given user of said subset of users to be stored in the buffer, selecting for each user of said subset of users the larger capacity value of: said minimum buffer capacity assigned to the user, or actual buffer capacity occupied by the user at said given instant, calculating a modified total number of packets stored in the buffer by summing up the selected capacity values, and inhibiting said storing of additional packets, if said calculated modified total number of packets stored in the buffer exceeds or equals said portion of storage capacity of the buffer, and if the actual buffer capacity occupied by said given user of said subset of users at said given instant exceeds or equals the minimum buffer capacity assigned to said given user of said subset of users.

* * * * *